United States Patent [19]

Burns et al.

[11] Patent Number: 4,962,069

[45] Date of Patent: Oct. 9, 1990

[54] HIGHLY DENSIFIED BODIES FROM PRECERAMIC POLYSILAZANES FILLED WITH SILICON CARBIDE POWDERS

[75] Inventors: Gary T. Burns; Chandan K. Saha, both of Midland, Mich.; Ronald J. Keller, Solon, Ohio

[73] Assignee: Dow Corning Corporation, Midland, Mich.

[21] Appl. No.: 268,398

[22] Filed: Nov. 7, 1988

[51] Int. Cl.$^5$ .............................................. C04B 35/52
[52] U.S. Cl. ........................................ 501/90; 501/88; 501/91; 501/92; 106/287.13
[58] Field of Search ................... 106/287.13; 524/404, 524/424, 437, 439, 441; 501/88, 89, 90, 91, 154

[56] References Cited

U.S. PATENT DOCUMENTS

| | | | |
|---|---|---|---|
| 3,090,691 | 5/1963 | Weyer | 106/39 |
| 3,108,985 | 10/1963 | Weyer | 260/37 |
| 3,485,904 | 12/1969 | Ostrowksi | 264/63 |
| 3,836,673 | 9/1974 | Weaver et al. | 423/345 |
| 3,853,566 | 12/1974 | Prochazka | 106/44 |
| 4,004,934 | 1/1977 | Prochazka | 106/44 |
| 4,041,117 | 5/1978 | Prockazka | 106/44 |
| 4,082,284 | 3/1978 | Prockazka et al. | 106/44 |
| 4,122,139 | 10/1978 | Yajima et al. | 264/44 |
| 4,255,316 | 3/1981 | Blizzard | 260/37 SB |
| 4,269,753 | 5/1981 | Mine et al. | 260/33.4 SB |
| 4,269,757 | 5/1981 | Mine et al. | 260/37 SB |
| 4,289,720 | 9/1981 | Yajima et al. | 264/63 |
| 4,395,460 | 7/1983 | Gaul | 428/408 |
| 4,524,138 | 6/1985 | Schwetz | 501/90 |
| 4,701,427 | 10/1987 | Boecker | 501/92 |
| 4,753,903 | 6/1988 | Saito | 501/88 |
| 4,762,810 | 8/1988 | Endo et al. | 501/88 |
| 4,771,118 | 7/1988 | Takamizawa | 528/14 |

FOREIGN PATENT DOCUMENTS

| | | |
|---|---|---|
| 1180189 | 4/1982 | Canada . |
| 3500962 | 7/1985 | Fed. Rep. of Germany . |
| 54-13474 | 6/1979 | Japan . |
| 60-16869 | 7/1985 | Japan . |

OTHER PUBLICATIONS

Yajima, et al.; "SiC and Si$_3$N$_4$ Sintered Bodies with New Borodiphenylsiloxane Polymers as Binder" 266 Nature 522 (1977).

Yajima, et al.; "Pyrolysis of a Polyborodiphenylsiloxane" 266 Nature 521 (1977).

*Primary Examiner*—William R. Dixon, Jr.
*Assistant Examiner*—Chris Gallo
*Attorney, Agent, or Firm*—Roger E. Gobrogge

[57] ABSTRACT

The preparation of highly densified ceramic bodies by the sintering of certain preceramic polysilazanes filled with silicon carbide powders, metal-containing sintering aids, and, optionally, polysilazane curing agents is described. Such highly densified ceramic bodies can be prepared by either a pressureless sintering process or a hot press sintering process. The compositions of this invention can be formed into desired shapes and then sintered to form ceramic, shaped bodies with high densities. One advantage of the present invention is that the green bodies have relative high strengths and thus can be easily handled and, if desired, machined before sintering. The preceramic polysilazanes useful in this invention must yield ceramic chars which contains free or excess carbon in addition to carbon in the form of silicon carbide upon pyrolysis to elevated temperatures.

48 Claims, No Drawings

HIGHLY DENSIFIED BODIES FROM PRECERAMIC POLYSILAZANES FILLED WITH SILICON CARBIDE POWDERS

BACKGROUND OF INVENTION

This invention relates to the preparation of highly densified ceramic bodies by the pyrolysis of certain preceramic polysilazanes filled with silicon carbide powders, certain metal-containing sintering aids, and, optionally, certain polysilazane curing agents. Such highly densified ceramic bodies can be prepared by either a pressureless sintering process or a hot press sintering process. This invention also relates to novel compositions comprising silicon carbide powder, a metal-containing sintering aid, a preceramic polysilazane, and, optionally, a polysilazane curing agent. These compositions of matter can be formed into green bodies of the desired shape and sintered to form ceramic, shaped bodies with high densities. One advantage of the present invention is that the green bodies have relative high strengths and thus can be easily handled and, if desired, machined before sintering. Green bodies prepared from silacyclobutasilazane polymers or polysilazanes containing polysilazane curing agents may be cured prior to the sintering step thereby increasing the strength.

Prockazka in U.S. Pat. Nos. 4,004,934 and 4,041,117 and Prockazka et al. in U.S. Pat. No. 4,081,284 describe high density silicon carbide ceramic bodies prepared in a pressureless sintering process. Such ceramic bodies were prepared from mixtures consisting of silicon carbide powder, a boron-containing additive, and a carbonaceous additive. The carbonaceous additives or binders were high molecular weight, carbon-based aromatic compounds such as phenol-formaldehyde condensate-novolak, resorcinol-formaldehyde, aniline-formaldehyde, cresol-formaldehyde, derivatives of polynuclear aromatic hydrocarbon compounds contained in coal tar, polyphenylene, polymethylphenylene, and the like. Ceramic silicon carbide materials with greater than 85% of theoretical density were obtained.

Onda et al. in Japanese Kokai Patent No. 60-16869 describe a method of preparing high density silicon carbide ceramics which involves pressureless sintering a mixture consisting of silicon carbide powder, an auxiliary sintering aid, and an organosilicon polymer characterized by a Si-C skeletal structure. Disclosed sintering aids include boron-, aluminum-, and berylliumcontaining compounds. The organosilicon polymers were described as "high-molecular-weight organic silicon-containing compounds with siliconcarbon skeletal structures." The organosilicon polymers were not further identified even in the examples. Based on this limited description, however, it appears that the organosilicon polymers were polycarbosilanes which have a Si-C skeletal backbone.

The present invention provides high density ceramic products from a pressureless sintering process or a hot press sintering process using polysilazanes as binders. Generally, high density ceramic materials will possess high strengths. One unique aspect of this invention is that a Si-N containing material is used as a precursor for a silicon carbide material which contains only limited amounts of nitrogen.

THE INVENTION

This invention relates to a method of preparing a sintered body of silicon carbide, said method comprising (a) forming a handleable green body by (i) preparing an intimate mixture comprising silicon carbide powder, a metal-containing sintering aid, and the preceramic polysilazane, where the metal-containing sintering aid is present at 0.1 to 3.0 weight percent of the metal based on the weight of silicon carbide powder and where the preceramic polysilazane is present at such a level that the free carbon value of the mixture is greater than 0.4 weight percent based on the total weight of the silicon carbide powder and the char derived from the preceramic polysilazane and (ii) then forming the intimate mixture into the desired shape under pressure at a temperature less than about 500° C. to obtain a handleable green body; and (b) sintering the handleable green body in an inert atmosphere at a temperature greater than 1900° C. to obtain a sintered body of silicon carbide with a density greater than 2.4 g/cm$^3$.

This invention also relates to a method of forming a handleable green body, which method comprises (a) preparing an intimate mixture comprising silicon carbide powder, a metal-containing sintering aid, and a preceramic polysilazane, where the metal-containing sintering aid is present at 0.1 to 3.0 weight percent of the metal based on the weight of silicon carbide powder and where the preceramic polysilazane is present at such a level that the free carbon value of the mixture is greater than 0.4 weight percent based on the total weight of the silicon carbide powder and the char derived from the preceramic polysilazane; and (b) forming the intimate mixture into the desired shape under pressure at a temperature less than about 500° C.

This invention additionally relates to a uniform mixture comprising silicon carbide powder, a metal-containing sintering aid, and a preceramic polysilazane, where the metal-containing sintering aid is present at 0.1 to 3.0 weight percent of the metal based on the weight of silicon carbide powder and where the preceramic polysilazane is present at such a level that the free carbon value of the mixture is greater than 0.4 weight percent based on the total weight of the silicon carbide powder and the char derived from the preceramic polysilazane. The compositions of this invention may also optionally contain a polysilazane curing agent.

This invention is concerned with the preparation of highly densified sintered bodies from polysilazanes filled with silicon carbide powder. The sintered bodies produced from the practice of this invention have densities greater than about 75% of theoretical (i.e., densities greater than about 2.4 g/cm$^3$). Such highly densified bodies are useful as light weight refractory ceramics. The theoretical density of silicon carbide is 3.21 g/cm$^3$.

The novel compositions of the present invention consist essentially of a polysilazane filled with silicon carbide powder, a metal-containing sintering aid, and, optionally, a polysilazane curing agent. These novel compositions can be used to prepare handleable green bodies. By "handleable green bodies" we mean that these green bodies have sufficient strength to be handled or machined prior to sintering. Additionally, compositions containing a silacyclobutasilazane polymer or a polysilazane with a polysilazane curing agent may be cured prior to sintering to obtain even stronger green bodies. The high green strength is one significant advantage of the present invention; the high green strength allows the green body to be further processed and shaped prior to the final sintering step. Generally, green strengths of 500 psi or more may be obtained in the practice of this invention.

The green bodies may be formed by conventional techniques known in the art. Such methods include pressure molding, uniaxial pressing, isopressing, extrusion, transfer molding, injection molding, and the like. The formed green bodies may be further shaped by machining if desired. Once shaped, the green bodies are fired to an elevated temperature under an inert atmosphere to convert the green bodies into ceramic articles having densities greater than about 75% of theoretical. It is preferred that the density of the ceramic article be greater than about 85% of theoretical (2.7 g/cm$^3$). It is more preferred that the density be greater than about 2.9 g/cm$^3$ (90% of theoretical); it is most preferred that the density be greater than about 3.05 g/cm$^3$ (95% of theoretical). The sintering may be carried out using either a pressureless sintering process or a hot press sintering process. When employing the compositions of this invention, either process will produce a highly densified ceramic article. The hot press sintering process will generally produce higher density ceramic articles. Therefore, if the maximum density is desired, a hot press sintering process would be preferred. Generally however, the pressureless sintering process is preferred because of the simplified operations involved. The sintering is carried out under an inert atmosphere such as nitrogen or argon.

The sintering or pyrolysis step to yield the final ceramic product is generally carried out at a temperature of about 1900° C. or higher. Lower temperature can be used but the ceramic product may not possess the desired density. The preferred sintering temperature is about 2000° to 2200° C. with about 2075° to 2150° C. being most preferred.

The polysilazanes useful in this invention are generally well known in the art. The polysilazanes must be capable of being converted to a stable silicon carbide ceramic char with a significant ceramic char yield. "Stable silicon carbide ceramic" is defined as the ceramic char produced at an elevated temperature which will not significantly decrease in weight upon further exposure at the elevated temperature and which consists essentially of silicon and carbon with only limited amounts of nitrogen. The amount of nitrogen present in the stable silicon carbide ceramic char should be less than about 1 weight percent and preferably less than about 0. weight percent. Generally, the ceramic char yield should be greater than about 20 weight percent. Naturally, there will be less shrinkage if the ceramic char yield is higher. Therefore, it is preferred that polysilazanes with ceramic char yields greater than about 40 weight percent be employed in the practice of this invention. The polysilazane must also yield a ceramic char containing free carbon. Using a rule of mixtures, a silicon carbide ceramic char must contain greater than about 30 weight percent total carbon in order for free carbon to be present. Polysilazanes which yield ceramic chars with greater than about 40 weight percent total carbon ar preferred. A 40 weight percent carbon-containing ceramic material contains, based on a rule of mixtures, about 86 weight percent SiC and 14 weight percent free carbon. Most preferred are polysilazanes which yield ceramic chars with greater than about 50 weight percent total carbon; a 50 weight percent carbon-containing ceramic material contains, based on a rule of mixtures, about 72 weight percent SiC and 28 weight percent free carbon. It is generally preferred that the ceramic char contain at least 10 weight percent free carbon. It is more preferred that the ceramic char contain at least 25 weight percent free carbon.

So long as the polysilazane can be converted to a ceramic char with sufficient char yield and the derived ceramic char contains sufficient free carbon, the structure of the polysilazane is not critical. The polysilazanes of this invention generally contain units of the type [R$_2$SiNH], [RSi(NH$_{1.5}$)], and/or

[R'$_2$CR''$_2$CR'''$_2$CSiNH]

where each R is independently selected from the group consisting of hydrogen, alkyl radicals containing 1 to 20 carbon atoms, aryl radicals, and vinyl radicals and each R', R'', and R''' is independently selected from the group consisting of hydrogen, alkyl radicals having 1 to 4 carbon atoms, aryl radicals, and vinyl radicals. Generally, polysilazanes which contain [Ph$_2$SiNH], [PhSi(NH)$_{1.5}$], and/or

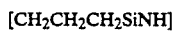
[CH$_2$CH$_2$CH$_2$SiNH]

units are preferred. The phenyl-containing silazane units easily allow for the formation of ceramic chars with sufficient free carbon. Silacyclobuta-containing units allow for curing without the need for added catalysts. Naturally, the polysilazanes useful in this invention may contain other silazane units. Examples of such units include [MeSi(NH)$_{1.5}$], [Me$_2$SiNH], [ViSi(NH)$_{1.5}$], [Vi$_2$SiNH], [PhMeSiNH], [PhViSiNH], [MeViSiNH], and the like. Mixtures of polysilazanes may be employed in the practice of this invention. The presence of vinyl-containing units allows for curing, with the appropriate polysilazane curing agents, even in the absence of silacyclobuta-containing units.

The polysilazanes of this invention can be prepared by techniques well known in the art. The actual method used to prepare the polysilazane is not critical. Suitable preceramic silazane polymers or polysilazanes may be prepared by the methods of Gaul in U.S. Pat. Nos. 4,312,970 (issued Jan. 26, 1982), 4,340,619 (issued July 20, 1982), 4,395,460 (issued July 26, 1983), and 4,404,153 (issued Sept. 13, 1983), all of which are hereby incorporated by reference. Suitable polysilazanes also include those prepared by the methods of Haluska in U.S. Pat. No. 4,482,689 (issued Nov. 13, 1984) and Seyferth et al. in U.S. Pat. No. 4,397,828 (issued Aug. 9, 1983), both of which are hereby incorporated by reference. Other polysilazanes suitable for use in this invention can be prepared by the methods of Cannady in U.S. Pat. Nos. 4,540,803 (issued Sept. 10, 1985) and 4,543,344 (issued Sept. 24, 1985) which are hereby incorporated by reference. Still other polysilazanes may be suitable for use in this invention as long as the derived ceramic char contains sufficient free carbon. Specific methods for preparation of suitable polysilazanes are illustrated in the examples included in the present specification.

Especially preferred polysilazanes are the polysilacyclobutasilazanes, polydisilacyclobutasilazanes, and silane-modified polysilacyclobutasilazanes described in Burns, U.S. patent application Ser. No. 059,718, filed on June 8, 1987; Burns, U.S. patent application Ser. No. 059,717, filed on June 8, 1987; and Burns, U.S. patent application Ser. No. 213,380, filed on June 30, 1988, respectively, each of which are hereby incorporated by reference. For purposes of this specification, the term "silacyclobutasilazane polymer" is intended to include the polysilacyclobutasilazanes, polydisilacyclobutasilazanes, and silane-modified polysilacyclobutasilazanes of the just indicated patent applications. The silacyclobutasilazane polymers are thermally or catalytically crosslinkable. Therefore, green bodies prepared from these silacyclobutasilazane polymers may be cured prior to the sintering step. Such cured green bodies generally possess higher green strengths than similar uncured green bodies.

The polysilacyclobutasilazanes of this invention can be prepared by (1) contacting and reacting in an inert, essentially anhydrous atmosphere, a 1,1-dichloro-1-silacyclobutane having the general formula

R$_2$CR'$_2$Cr''$_2$CSiCl$_2$ with a difunctional nucleophile selected from the group consisting of ammonia, hydrazine, and diamines having the general formula HR'''NQNR$^{iv}$H at a temperature less than about 50° C. for a time sufficient to form polysilacyclobutasilazane and (II) recovering the polysilacyclobutasilazane from the reaction mass in (1), wherein each R, R', R'', R''', and R$^{iv}$ is independently selected from hydrogen, alkyl radicals having 1 to 4 carbon atoms, aryl radicals, and vinyl radicals and Q is a divalent hydrocarbon radical. The preparation of these polysilacyclobutasilazanes is described in detail in U.S. patent application Ser. No. 059,718 and, therefore, need not be repeated here.

The polydisilacyclobutasilazanes can be prepared by (I) contacting and reacting in an inert, essentially anhydrous atmosphere, a chloro-1,3-disilacyclobutane having the formula

R'R''CX'ClSiR'''R$^{iv}$CSiX''Cl where R', R'', R''', and R$^{iv}$ are each independently selected from the group consisting of hydrogen, alkyl radicals containing 1 to 4 carbon atoms, aryl radicals, and vinyl radicals and both X' and X'' are selected from the group consisting of chlorine, bromine, fluorine, alkyl radicals containing 1 to 4 carbon atoms, aryl radicals, and vinyl radicals, with a cyclic silazane or a mixture of cyclic silazanes selected from the groups consisting of silazanes having the general formula (i) (CH$_3$RSiNH)$_x$ and (ii) (C$_6$H$_5$RSiNH)$_x$ wherein each R is independently selected from the group consisting of hydrogen, alkyl radicals containing 1 to 4 carbon atoms, aryl radicals, and vinyl radicals, and x has a value of 3, 4, 5, or 6 at a temperature less than about 50° C., for a time sufficient to form polydisilacyclobutasilazanes; (II) contacting the product from (I) with essentially anhydrous gaseous ammonia: and (III) recovering the polydisilacyclobutasilazane from the reaction mass in (II). The preparation of these polydisilacyclobutasilazanes is described in detail in U.S. patent application Ser. No. 059,717 and, therefore, need not be repeated here.

The preferred silane-modified polysilacyclobutasilazanes can be prepared by the method comprising (A) contacting and reacting in an inert, essentially anhydrous atmosphere, a polysilacyclobutasilazane or a polydisilacyclobutasilazane with a compound or mixture of compounds selected from the group consisting of (i) chlorosilanes having the general formula (R$^v$)$_m$SiCl$_{4-m}$ and (ii) chlorodisilanes having the general formula {Si(R$^v$)$_t$Cl$_{4-t}$}$_2$ where, in the general formulae for chlorosilanes and chlorodisilanes, each R$^v$ is independently selected from hydrogen, alkyl radicals having from 1 to 4 carbon atoms, aryl radicals, and vinyl radicals; m is 0, 1, or 2; and t is 0 to 2; at a temperature less than about 50° C. for a time sufficient to form a partially modified polysilacyclobutasilazane; (B) contacting and reacting the partially modified polysilacyclobutasilazane with dry ammonia; and (C) recovering the silane-modified polysilacyclobutasilazane. The preparation of these silane-modified polysilacyclobutasilazanes is described in detail in U.S. patent application Ser. No. 213,380 and, therefore, need not be repeated here. The silane-modified polysilacyclobutasilazanes are the preferred silacyclobutasilazane polymers.

In addition to the polysilazane, other components in the compositions of this invention include silicon carbide powder, a metal-containing sintering aid, and, optionally, a polysilazane curing agent. The silicon carbide powders useful in this invention are commercially available. Both alpha-SiC and beta-SiC powders, as well as mixtures, can be used. Generally, SiC powders with an average particle size of less than five microns are preferred; powders with an average particle size of less than one micron are more preferred.

Suitable metal-containing sintering aids include iron Fe$_3$C,. magnesium, MgC$_3$, lithium, Li$_2$C$_2$, beryllium, Be$_2$C, boron, boron-containing compounds, aluminum, aluminum-containing compounds, and metal oxides such as thorium oxide, yttrium oxide, lanthanum oxide, and cerium oxide. Many of these metal-containing sintering aids are described in Negita "Effective Sintering Aids for Silicon Carbide Ceramics: Reactivities of Silicon Carbide with Various Additives," 69 J. Am. Ceram. Soc. C-308 (1986). Other metal-containing sintering aids suggested by Negita might also be effective in the practice of this invention. Generally, the sintering aid should be present at an amount equivalent to about 0.1 to 3.0 weight percent of the metal based on the weight of the silicon carbide powder. Preferred sintering aids are selected from the group consisting of boron, boron-containing compounds, aluminum, and aluminum-containing compounds. Examples of boron-containing sintering aids include boron carbide, lithium borohydride, trivinylboron, triphenylboron, silicon hexaboride, H$_3$BO$_3$, B$_2$O$_3$, and the like. Examples of aluminum-containing sintering aids include aluminum oxide, aluminum nitride, aluminum diboride, and the like. The most preferred sintering aids are boron and boron carbide. Mixtures of sintering aids may also be used.

The compositions of this invention may also contain polysilazane curing agents. The polysilazane curing agents are normally employed with non-silacyclobuta-containing, vinyl-containing polysilazanes. Such polysilazane curing agents can be used to cure (via crosslinking the polysilazanes) the shaped articles prior to sintering. Such cured articles generally have higher strengths than the noncured articles and, thus, can better withstand any handling or machining processes prior to sintering. Conventional polysilazane curing agents which are useful in the present invention are well known in the art. Examples include organic peroxides such as dibenzoyl peroxide, bis-p-chlorobenzol peroxide, bis-2,4-dichlorobenzol peroxide, di-t-butyl peroxide, dicumyl peroxide, t-butyl perbenzoate, t-butyl peracetate, 2,5-bis(t-butylperoxy)-2,3-dimethylhexane, and the like. Preferred polysilazane curing agents include dicumyl peroxide and t-butyl perbenzoate. Other conventional polysilazane curing agents known in the art may also be used. The polysilazane curing agent is present in an effective amount, i.e. an amount sufficient to induce crosslinking in the polysilazane. Therefore, the actual amount of the polysilazane curing agent will depend on the activity of the actual agent used. Normally, however, the peroxide curing agent will be present at about 0.1 to 5.0 weight percent based on the weight of the polysilazane with the preferred curing agent level being about 2.0 weight percent.

The preceramic polysilazane is present in the compositions of the present invention at such a level that the free carbon value of the composition is greater than 0.4 weight percent based on the total weight of the silicon carbide powder and the char derived from the preceramic polysilazane.

What is meant by "free carbon value of the mixture" in this invention is the amount of free or excess carbon derived from the polysilazane during pyrolysis as expressed by a weight percentage based on the total weight of the silicon carbide powder and the char derived from the polysilazane. The total amount of carbon in the ceramic char equals the amount of free or excess carbon plus the amount of carbon in the form of silicon carbide. The amount of free carbon derived from the polysilazane is determined by pyrolysis of the polysilazane, in the absence of any silicon carbide powder or sintering aid, to an elevated temperature under an inert atmosphere until a stable silicon carbide ceramic char is obtained. For purposes of this invention, a "stable silicon carbide ceramic char" is defined as the ceramic char produced at an elevated temperature which will not significantly decrease in weight upon further exposure at the elevated temperature and which consists essentially of silicon and carbon with only limited amounts of nitrogen. Normally, a stable silicon carbide ceramic char is produced upon pyrolysis at 1800° C. for about 30 minutes. Other elevated temperatures can be used to form the stable silicon carbide ceramic char but the length of exposure to elevated temperature will need to be increased for temperatures less than 1800° C. Both the ceramic yield and the carbon content of the stable silicon carbide ceramic char are then determined. Using a rule of mixtures, the amount of SiC and free carbon of the stable silicon carbide ceramic char can be calculated. The amount of free carbon normally is expressed as weight of free carbon produced per gram of preceramic polysilazane. Knowing the amount of free carbon produced by pyrolysis of the polysilazane, one can determine how much polysilazane is required to obtain a polysilazane/silicon carbide mixture with the desired free carbon value. Naturally, if one is using the same or very similar polysilazane to prepare a sintered body, it is not required that the amount of free carbon produced per gram of polysilazane be determined every time.

This procedure can perhaps be best illustrated by example. Assume a polysilazane (100 g) which gives, upon pyrolysis to 1800° C., a char yield of 50 weight percent which contains 40 weight percent carbon and 60 weight percent silicon. Such a char contains 30 g (1.07 moles) silicon. Using a rule of mixtures, the char also contains 1.07 moles (12.8 g) of carbon in the form of SiC. Since the char contains 20 g carbon, the amount of free carbon in the char is 7.2 g (20 g minus 12.8 g). Thus each gram of the preceramic polysilazane yields 0.072 g free carbon. If a free carbon value for the mixture of 2.0 weight percent is desired, the following calculations can be performed. Let X equal the amount of polysilazane required. The amount of char derived from the polysilazane is 0.5X (in grams, based on a 50% char yield); the amount of free carbon formed during the pyrolysis is 0.072X (in grams). For a mixture containing 100 g of SiC powder, the equation $$0.020 = (0.072X)/(100 + 0.5X)$$

is obtained where 0.072X is the amount of free carbon derived from the polysilazane and (100+0.5X) is the total weight of SiC powder and char derived from the polysilazane. Solving the above equation for X, it is found that 32.3 g of the polysilazane will give the desired 2.0% free carbon value of the mixture. Using this procedure, the amount of polysilazane required to prepare the compositions of this invention can be determined. This procedure avoids the costly and time consuming trial and error method which might otherwise be required.

The free carbon value of the mixture must be greater than 0.4 weight percent based on the total weight of the silicon carbide powder and the char derived from the polysilazane. For free carbon values less than about 0.4 weight percent the density of the sintered body will generally fall below about 2.4 g/cm$^3$ (75% of theoretical). It is generally preferred that the free carbon value of the mixture is greater than 0.8% and that the density of the resulting sintered body be greater than about 85% of theoretical. It is more preferred that the free carbon value of the mixture be between 0.8 and 3.0 weight percent with a range of 1.5 to 2.5 weight percent being even more preferred. The optimum density is generally obtained when the free carbon value of the mixture is about 2.0 weight percent.

Once the amount of polysilazane required in the mixture has been determined, the various components are combined in a manner that assures a uniform and intimate mixture. Such a mixture is required to avoid areas of varying density throughout the sintered product. Uniform and intimate mixtures can be prepared by using conventional blending techniques. Examples of such techniques include grinding the various powders in either the dry or wet state. Generally preferred is wet grinding where the various powders are mixed and ground with organic solvents, the solvent removed, and then the resulting mixture is further ground. Other mixing and grinding methods will be apparent to those skilled in the art. The uniform and intimate mixture may then be formed into the desired shape. Preferably, the desired shape is formed under pressure using such methods as injection molding, uniaxial pressing, isopressing, extrusion, transfer molding, and the like. Once formed the article may be further shaped by machining. Once the final shape has been obtained, the article is sintered in an inert atmosphere to a temperature of 1900° C. or more. The preferred sintering temperature is about 2000° to 2200° C. with about 2075° to 2150° C. being most preferred.

When the polysilazane employed is a silacyclobutasilazane polymer, the composition is preferably cured prior to its final shaping. Generally, such curing can be carried out by heating the article to about 150° to 300° C. or by the use of a ring-opening curing agent. Examples of suitable ring-opening curing agents include metal hydrides such as sodium, potassium, or lithium hydrides; metal alkoxides such as sodium, potassium, or lithium methoxides; metal amides such as lithium diethylamide; rhodium catalysts such as Wilkinson's catalyst; and platinum catalysts such as chloroplatinic acid. The ring-opening curing agent is present in an effective amount, i.e. an amount sufficient to induce crosslinking in the silacyclobutasilazane polymer. Therefore, the actual amount of the ring-opening curing agent will depend on the activity of the actual curing agent used. Normally, however, the non-platinum or non-rhodium ring-opening curing agent will be present at about 0.1 to 5.0 weight percent based on the weight of the polysilazane with the preferred level being about 2.0 weight percent. For platinum- or rhodium-containing ring-opening curing agents, the level of the curing agent will normally be such that platinum or rhodium is present at about 1 to 1000 ppm based on the weight of the polysilazane with the preferred level at about 50 to 150 ppm platinum or rhodium.

Although not wishing to be limited by theory it is thought that the free carbon derived from the preceramic polysilazane plays two different roles in the formation of highly densified sintered bodies. First, it helps remove oxygen present in the silicon carbide powder; and secondly, it apparently acts as an additional sintering aid. Silicon carbide powders often contain so called "free carbon." However, the "free carbon" present in the silicon carbide powder does not appear to be as active or effective as free carbon generated in situ from the preceramic polysilazane. It is not clear whether the free carbon produced in situ is more active chemically or whether it is simply more evenly dispersed. In any event, when the free carbon value of the mixture (as defined earlier) is about 2.0 weight percent, sintered bodies with optimum densities are obtained.

So that those skilled in the art can better appreciate and understand the invention, the following examples are given. Unless otherwise indicated, all percentages are by weight. Throughout the specification "Me" represents a methyl group, "Ph" represents a phenyl group, "Vi" represents a vinyl group, and "$C_3H_6Si$" represents a

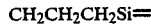

group.

In the following examples, the analytical methods used were as follows:

Proton NMR spectra were recorded on either a Varian EM360 or EM390 spectrometer. Gel permeation chromatography (GPC) data were obtained on a Waters GPC equipped with a model 600E systems controller, a model 490 UV and model 410 Differential Defractometer detectors; all values are relative to polystyrene.

Carbon analysis was done on a Control Equipment Corporation 240-XA Elemental Analyzer. Oxygen analysis was done on a Leco Oxygen Analyzer equipped with an Oxygen Determinator 316 (Model 783700) and an Electrode Furnace EF100. Silicon was determined by a fusion technique which consisted of converting the silicon material to soluble forms of silicon and analyzing the solute for total silicon by atomic absorption spectrometry.

Compounding was done on a Brabender Plasticorder (Model PL-V151) equipped with roller blades. A 12 ton Hull console molding machine (model 359E) was used for transfer molding. Test bars were formed on a Carver laboratory press (Fred S. Carver Inc., Summit, N.J.). Pyrolysis was carried out in an Astro graphite element tube furnace Model 1000-3060-FP12 equipped with an Eurotherm Controller/Programmer Model 822. Flex strengths (using the four-point bend technique) were determined on either a Model TTC or Model 8562 Instron instrument.

Two different SiC powders were employed, Ibiden UF SiC ("Ibiden"), which contains a mixture of about 5 to 8% alpha-SiC and 92 to 95% beta-SiC; and Superior Graphite (HSC 059) beta-SiC ("Superior Graphite"). The boron used was amorphous boron powder from Cerac Inc. The boron carbide (Tetrabor) was from Elektroschmelzwerk Kempten Gnbh., Munich, West Germany. The aluminum oxide (Baikalox CR 125) was obtained from Baikowski International Corp., Charlotte, N.C.

EXAMPLE 1

Sintered Body from $[C_3H_6SiNH]_{0.5}[Ph_2SiNH]_{0.25}[PhSi(NH)_{1.5}]_{0.25}$

A—Polymer Preparation. A mixture of 112.9 g (0.80 moles) 1,1-dichloro-1-silacyclobutane, 101.3 g (0.40 moles) diphenyldichlorosilane, and 84.6 g (0.40 moles) phenyltrichlorosilane dissolved in about 1200 mL dry toluene was cooled to −78° C. Ammonia was rapidly bubbled through the solution for three hours. The reaction mixture was allowed to warm to room temperature and the excess ammonia was distilled off. After filtering through a medium glass frit, the filtrate was concentrated under vacuum; the residue was stripped at 150°–170° C. and 1 torr for about three hours. A viscous gum was obtained in 69% yield (140 g). GPC molecular weight (THF): $M_n=492$, $M_w=1119$. The glass transition temperature was 30.8° C. NMR (d$_8$-toluene, delta values): 0.6 to 1.90 (broad multiplet, $C_3H_6$ and NH), 7.30 (broad singlet. SiPh), 7.63 (broad singlet. SiPh): the SiPh/($C_3H_6$+NH) ratio was 1.0/1.06.

B—Char Composition Calculations. A sample of the polysilazane was weighed into a graphite crucible and transferred to an Astro tube furnace. The furnace was twice evacuated to less than 20 torr and then backfilled with argon. Under an argon flow, the sample was heated to 1800° C. at 10° C./min and then held at 1800° C. for two hours before cooling to room temperature. The sample had a mass retention of 52.2% and contained 57.7% carbon, 40.1% silicon, and 0.6% oxygen. The following calculations were made. 100 g of the fired polymer gives 52.2 g of a ceramic char consisting of 57.7% carbon and 42.3% (by difference) silicon. (In order to simplify the calculations, the amount of oxygen and nitrogen, if present, has been ignored.) The char consists of 31.5 g SiC (60.4%) and 20.7 g free carbon (39.6%). Therefore, each gram of polymer gives 0.315 g SiC and 0.207 g free carbon.

C—Test bar fabrication. Six test bars were prepared using the following procedure: Weighed samples of the silazane polymer, Ibiden SiC powder, boron powder, and about 150 mL toluene were milled for about thirty minutes in an attritor mill using 400 g of a SiC milling media under an inert atmosphere. The solvent was stripped and the residue dried under vacuum. The dried powder was further ground and then sieved through a 60 mesh sieve. The sieved powder was dry pressed to form test bars (35×8×2 mm) in a tungsten carbide lined die at 15 ksi under a nitrogen atmosphere. The test bars were fired to 2150° C. using the following temperature program: room temperature to 300° C. at 26.7° C./min, 300° to 700° C. at 25° C./min, 700° to 1350° C. at 20° C./min, 1350° C. for 30 minutes, 1350° to 2150° C. at 20° C./min, and 2150° C. for 30 minutes. The densities of the fired test bars were measured. The following results were obtained:

| Test Bar | Wt. (g) Polymer | Wt. (g) SiC | Wt. (g) Boron | Fired Density (g/cm$^3$) | Free Carbon Value (%) |
|---|---|---|---|---|---|
| 1 | 0.777 | 39.23 | 0.196 | 2.48 (77%) | 0.4 |
| 2 | 1.296 | 32.809 | 0.164 | 2.66 (83%) | 0.8 |
| 3 | 2.105 | 38.571 | 0.1928 | 2.92 (91%) | 1.1 |
| 4 | 2.453 | 32.589 | 0.1629 | 2.97 (93%) | 1.5 |
| 5 | 2.850 | 30.00 | 0.150 | 3.11 (97%) | 1.9 |
| 6 | 4.98 | 38.608 | 0.193 | 3.07 (96%) | 2.5 |

Pellets wer also prepared from a mixture consisting of 30 g. Ibiden beta-silicon carbide powder, 2.7 g of the above polysilazine, and 0.15 g amorphous boron. The mixture had a free carbon value of 1.8%. The pellets were formed in a tungsten carbide-lined die at 350 MPa. The average green density was 1.99 g/cm$^3$. Pellets were sintered unser an argon atmosphere to varying temperatures. The following results were obtaine:

| Sintering Temperature (°C.) | Density (g/cm$^3$) | Density (Percent of theoretical) |
|---|---|---|
| 2050 | 3.07 | 95.5 |
| 2055 | 3.08 | 95.9 |
| 2060 | 3.09 | 96.0 |

EXAMPLE pb 2

Sintered Bodies from [C$_3$H$_6$SiNH]$_{0.2}$[PhSi(NH)$_{1.5}$]$_{0.80}$

A—Polymwe Preparation. A polysilazne was prepared from 14.1 g (0.10 moles) 1,1-dichloro-1-silacyclobutane and 84.64 g (0.40 moles) phenyltrichlorosilane using the same procedure as in Example 1. A brittle solid (48.1 g, 81% yield) with a glass transition temperature of 66.4° C. was obtained.

B—Char Composition Calculations. A sample of the above polymer under argon was heated to 2100° C. at 15° C./min and held at 2100° C. for two hours before cooling to room temperature. The sample had a mass retention of 53.3% and contained 58.5% carbon and 41.1% silicon. The following calculations were made: 100 g of cured polymer gives 53.3 g of a ceramic char consisting of 58.5% carbon and 41.5% silicon (by difference). The char consists of 31.6 g SiC (59.3%) and 21.7 g carbon (40.7%). Therefore, each gram of polymer, after pyrolysis, gives 0.316 g SiC and 0.217 g free carbon.

C—Preparation of Sintered Pellets. A mixture of 30 g SiC (Superior Graphite), 1.2 g of the above polysilazane, 0.375 g of a dispersing agent (OLOA 1200 from Chevron Chemical), and 0.15 g amorphous boron was treated essentially as in Example 1, Part C, except that the final pellets were pressed at 250 MPa. The free carbon value was 0.85%. The green density of the pellets was 1.97 g/cm$^3$. The pellets were sintered at 2100° C. for one hour under an argon atmosphere in the absence of pressure. The sintered pellets had an average density of 2.97 g/cm$^3$ (92.5% of theoretical). The flex strength of the sintered pellets ranged from 29.5 to 58.1 ksi.

EXAMPLE 3

Hot Press Sintering

A mixture of 200 g beta-silicon carbide (Superior Graphite), 8.0 g of the polysilazane of Example 2, and 1.0 g boron, with a free carbon value of 0.85%, was prepared using the blending technique of Example 1. A 100 g sample of this blend was hot pressed to 2100° C., and 4 ksi pressure using the following profile: 20° C. for 10 minutes; 20° to 250° C. at 13.7° C./min; 250° C. for 15 minutes; 250° to 450° C. at 15° C./min; 450° to 580° C. at 5° C./min; 580° C. for 1 minute; 580° to 1200° C. at 10° C./min; 1200° C. for 15 minutes; 1200° to 2100° C. at 15° C./min; 2100° C. for 60 minutes; and finally cooling the sample to room temperature quickly. The final product (7.6×0.5 cm disc) had a density of 3.01 g/cm$^3$ (94% of theoretical). Test bars were machined from the pellet; flex strengths ranged from 59.4 to 87.7 ksi.

EXAMPLE 4

Sintered Bodies from
[C$_3$H$_6$SiNH]$_{0.57}$[Ph$_2$SiNH]$_{0.14}$[MeSi(NH)$_{1.5}$]$_{0.29}$ A—Polymer Preparation. A polysilazane was prepared from 56.4 g (0.40 moles) 1,1-dichloro-1-silacyclobutane, 25.3 g (0.10 moles) diphenyldichlorosilane, and 29.8 g (0.20 moles) methyltrichlorosilane using the same procedure as in Example 1. A gum (62.3 g, 72% yield) was obtained. GPC molecular weight (THF), M$_n$=138 and M$_w$=1514. NMR (d$_8$-toluene: delta values): 0.25 (broad single SiMe), 0.85 (broad single, NH), 1.5 (broad multiplet, SiC$_3$H$_6$), and 7.2 (broad multiplet, SiPh); SiPh/SiC$_3$H$_6$/NH/SiMe ratio was 1.0/2.6/2.0/1.8.

B—Char Composition Calculations. A sample of the above polymer under argon was heated to 1800° C. at 15° C./min and held at 1800° C. for two hours before cooling to room temperature. The sample had a mass retention of 45.0% and contained 50.3% carbon and 48.6% silicon. The following calculations were made: 100 g of cured polymer gives 45.0 g of a ceramic char consisting of 50.3% carbon and 49.7% silicon (by difference). The char consists of 32.0 g SiC (71.1%) and 13.0 g carbon (28.9%). Therefore, each gram of polymer, after pyrolysis, gives 0.320 g SiC and 0.130 g free carbon.

C—Preparation of Molded Parts. A 20 g sample of the polysilazane was loaded into a Brabender-Plasticorder compounder and heated to 150° C. under argon. Silicon carbide containing 0.5% boron was added to the thin polymer melt in 30 to 40 g aliquots with mixing speeds of 20 to 60 rpm. After the final addition, the mixture was stirred at 60 rpm for about 30 minutes. The compounder was cooled to room temperature and the hardened mixture removed and stored under an inert atmosphere.

Using blends prepared in this manner, samples were molded in spiral flow dies using a transfer molder at 160° C. with a ram pressure of 1500 psi and a clamping pressure of greater than 2500 psi. The molded parts were partially cured in the die by raising the temperature to greater than 225° C. The following results were obtained:

| Blend Number | SiC | Wt. % SiC | Vol. % SiC | Spiral Flow (in) | Free Carbon Value (%) |
| --- | --- | --- | --- | --- | --- |
| 1 | Superior Graphite | 70.0 | 46.7 | 28.0 | 4.6 |
| 2 | Superior Graphite | 73.7 | 51.0 | 13.0 | 3.9 |
| 3 | Ibiden | 72.7 | 50.0 | 40.5 | 4.1 |
| 4 | Ibiden | 75.0 | 53.0 | 38.0 | 3.7 |
| 5 | Ibiden | 76.5 | 55.0 | 29.5 | 3.4 |
| 6 | Ibiden | 77.5 | 56.5 | 10.0 | 3.3 |

EXAMPLE 5

Samples of Blend Numbers 1 (containing Superior Graphite SiC) and 4 (containing Ibiden SiC) from Example 4 were molded in a 12-cavity bar mold using a transfer molder at 160° C. with a ram pressure of 1500 psi and a clamping pressure greater than 2500 psi. The molded bars were then cured by heating the die to 250° C. The die was then transferred to an inert atmosphere box and cooled to room temperature before the bars were removed. The average density of the both sets of cured bars was 2.19 g/cm$^3$. The bars were then sintered to 2050° C. under argon using the following temperature program: room temperature to 1000° C. at less than 3° C./min, 1000° to 1350° C. at 25° C./min, 1350° C. for 30 minutes, 1350° to 2050° C. at 25° C./min, and 2050° C. for 30 minutes. The bars averaged a 15% weight loss, a 36% volume shrinkage, and a 15% linear shrinkage. The ceramic bars from Blend Number 1 had an average density of 3.02 g/cm$^3$ (94.2% of theoretical); bars from Blend Number 4 had an average density of 3.01 g/cm$^3$ (93.6% of theoretical).

EXAMPLE 6

A sample of Blend Number 3 of Example 4 was transferred molded in a two-piece Sylastic (trademark) "hat" mold at 160° C. and 1250 ram pressure. The molded parts were cured in the die by heating to 250° C. and then removed hot. The molded parts were then sintered free standing by heating to 2050° C. under argon using the following temperature profile: room temperature to 700° C. at 0.5° C./min, 700° to 1000° C. at 1.0° C./min, 1000° to 1350° C. at 25° C./min, 1350° C. for 30 minutes, 1350° to 2050° C. at 25° C./min, and 2050° C. for 30 minutes. A ceramic hat-shaped body was obtained with a density of 2.99 g/cm$^3$ (93.1% of theoretical), thereby demonstrating that complex shapes can be prepared by injection molding polysilazanes filled with SiC powder.

EXAMPLE 7

Sintering Under a Nitrogen Atmosphere.

A silazane/SiC mixture (with a free carbon value of 2.0%) containing 100 g Ibiden SiC, 10 g of the polysilazane of Example 1, and 0.5 g boron was prepared by attritor milling for 30 minutes using 880 g SiC/toluene milling media. The solvent was removed under vacuum. Test bars were prepared by pressing at 37 ksi and then fired to varying temperatures in flowing nitrogen using the following temperature program: room temperature to 1400° C. at 25° C./min, 1400° C. for 30 minutes, 1400 to the final temperature at 25° C./min, and the final temperature for 30 minutes. The following results were obtained:

| Sintering Temperature (°C.) | Density (g/cm$^3$) | Density (Percent of theoretical) |
| --- | --- | --- |
| 1880 | 2.11 | 65.8 |
| 1947 | 2.30 | 71.6 |
| 2000 | 2.46 | 76.6 |
| 2030 | 2.63 | 82.0 |
| 2042 | 2.55 | 79.4 |
| 2150 | 2.87 | 89.4 |
| 2150 | 2.97 | 92.5 |
| 2250 | 3.08 | 96.0 |

EXAMPLE 8

A slurry of the polysilazane of Example 1 (5.0 g), Ibiden SiC (44.5 g), and boron carbide (0.05 g) in toluene was prepared; the solvent was removed under vacuum until a thick paste was obtained. The paste was dried, ground in a hardened alumina mortar and pestle, and then passed through a 90 $\mu$m sieve. The blend had a free carbon value of 2.2%. The sieved powder was pressed into test bars at 47 ksi. The test bars were cured at 285° C. for 1.5 hours under argon. The average flex strength was 2099±303 psi. The test bars were fired to different temperatures under argon using the following temperature profile: room temperature to 1400° C. at 15° C./min, 1400° C. for 30 minutes, 1400° C. to the final temperature at 15° C./min, and at the final temperature for 30 minutes. When fired to 2075° C., the test bars had a density of 3.12 g/cm$^3$ (97% of theoretical) and an average flex strength of 31.1±4.0 ksi. When fired to 2100° C., the fired density was 3.15 g/cm$^3$ (98% of theoretical).

EXAMPLE 9

Test bars were prepared, cured, and fired using the same procedure as Example 8 except that they contained 5.0 g of the polysilazane of Example 1, 44.5 g Ibiden SiC, 0.25 g aluminum oxide, and 0.25 g boron. The cured test bars had a flex strength of 1576±351 psi. When fired to 2075° C. under argon, the density was 3.15 g/cm$^3$ (98% of theoretical) and the flex strength was 36.0±2.8 ksi. When fired to 2100° C., the density was also 3.15 g/cm$^3$.

EXAMPLE 10

Sintered Bodies from [PhSi(NH)$_{1.5}$]

A—Polymer Preparation. Ammonia was rapidly bubbled through a toluene (about 500 mL) solution of 185.3 g (0.88 moles) phenyltrichlorosilane at −78° C. for about 2 hours. The reaction mixture was allowed to warm to room temperature and the excess ammonia distilled off. After filtering, the polysilazane was dried under vacuum, yielding 80.6 g (72.1%) product. The resulting polysilazane had a 91ass transition temperature of 123.9° C. NMR (CDCl$_3$, delta values): 0.2 to 1.9 (broad hump, SiNH) and 6.5 to 7.9 (broad sin9let, SiPh): the SiPh/SiNH ratio was 1.0/1.95.

B—Char Composition Calculations. A sample of the above polysilazane was fired to 1900° C. and held at that temperature for 2 hours under an argon atmosphere. The sample had a mass retention of 49.5% and contained 50.8% carbon. The following calculations were made: 100 g of the fired polymer gives 49.5 g of a ceramic char consisting of 50.8% carbon and 49.2% (by difference) silicon. The char consists of 34.8 g SiC (70.3%) and 14.7 g free carbon (29.7%). Therefore, each gram of polymer gives 0.348 g SiC and 0.147 g free carbon.

C—Test Bar Fabrication. An intimate mixture of Ibiden SiC powder (22.50 g), the above polysilazane (2.50 g), and boron (0.125 g) was prepared using the same method as Example 8. The blend had a free carbon value of 1.5%. Test bars were prepared by pressing at 47 ksi and then fired to 2080° C. under argon using the following temperature profile: room temperature to 1400° C. at 15° C./min, 1400° C. for 30 minutes, 1400° to 2080° C. at 15° C./min, and 2080° C. for 30 minutes. The fired test bars had an average density of 3.09 g/cm$^3$ (96% of theoretical).

EXAMPLE 11

Sintered Bodies from
$[PhSi(NH)_{1.5}]_{0.52}[MeSi(NH)_{1.5}]_{0.15}$

A—Polymer Preparation. Ammonia was rapidly bubbled through a toluene (200 g) solution of phenyltrichlorosilane (90.27 g, 0.43 moles), vinyltrichlorosilane (43.3 g, 0.27 moles), and methyltriohlorosilane (19.0 g, 0.13 moles) at —78° C. for about 45 minutes. The reaction mixture was worked up as in Example 10, yielding 61.9 g (74% yield) Product with a glass transition temperature of 96.8° C. NMR (CDCl$_3$, delta values): —0.16 to 0.44 (broad singlet, SiMe), 0.86 to 1.74 (broad hump, NH), 5.34 to 6.04 (broad singlet, SiVi), and 6.84 to 7.84 (broad multiplet, SiPh); SiPh/SiVi/SiMe/SiNH ratio was 2.9/1.6/1.0/8.9.

B—Char Composition Calculations. A polysilazane sample was heated to 1900° C. (two hour hold at temperature) in argon. The sample had a mass retention of 53.8% and contained 60.1% carbon. The following calculations were made, 100 g of the fired polymer gives 53.8 g of a ceramic char consisting of 60.1% carbon and 39.9% (by difference) silicon. The char consists of 30.7 g SiC (57.1%) and 23.2 g free carbon (42.9%). Therefore, each gram of polymer gives 0.307 g SiC and 0.232 g free carbon.

C—Test Bar Fabrication. An intimate mixture containing 2.00 g of the above polysilazane, 23.00 g Ibiden SiC, and 0.125 g boron and test bars from the mixture (with a free carbon value of 1.9%) were prepared using the procedures described in Example 8. The test bars were fired to 2080° C. under an argon atmosphere using the same temperature program as Example 8. The average density of the test bars was 3.02±0.01 g/cm$^3$ (94% of theoretical).

EXAMPLE 12

Two different polysilazane/SiC blends were prepared using the procedure of Example 8. The first blend contained 2.00 g of the polysilazane of Example 11, 23.00 g Ibiden SiC, and 0.125 g boron. The second blend contained 2.00 g of the polysilazane of Example 11, 23.00 g Ibiden SiC, 0.125 g boron, and 0.035 g 2,5-bis(t-butylperoxy)-2,3-dimethylhexane. The free carbon values of the blends was 1.9%. Both blends were dry sieved through 125 μm screen and pressed into test bars at 47 ksi. Test bars prepared from each blend was then cured in an argon atmosphere by heating to 180° C. at 5° C./min and holding at 180° C. for 2 hours. Test bars from the first blend (no peroxide) gave the following results: (1) for the uncured bars, the green density was 2.01 g/cm$^3$ and the green flex strength was 612 psi and (2) for the cured bars, the green density was 2.01 g/cm$^3$ and the green flex strength was 640 psi. Test bars from the second blend (containing peroxide) gave the following results: (1) for the uncured bars, the green density was 2.01 g/cm$^3$ and the green flex strength was 537 psi and (2) for the cured bars, the green density was 2.00 g/cm$^3$ and the green flex strength was 1042 psi.

That which is claimed is:

1. A method of preparing a sintered body of silicon carbide, said method comprising
   (a) forming a handleable green body by
      (i) preparing an intimate mixture comprising silicon carbide powder, a metal-containing sintering aid, and a preceramic polysilazane, where the metal-containing sintering aid is present at 0.1 to 3.0 weight percent of the metal based on the weight of silicon carbide powder and where the preceramic polysilazane is present at such a level that the free carbon value of the mixture is greater than 0.4 weight percent based on the total weight of the silicon carbide powder and the char derived from the preceramic polysilazane and
      (ii) then forming the intimate mixture into the desired shape under pressure at a temperature less than about 500° C. to obtain a handleable green body; and
   (b) sintering the handleable green body in an inert atmosphere at a temperature greater than 2000° C. to obtain a sintered body of silicon carbide with a density greater than 2.4 g/cm$^3$.

2. A method as described in claim 1 wherein the free carbon value of the preceramic polysilazane is determined, prior to forming a handleable green body, by heating a known amount of the preceramic polysilazane under an inert atmosphere to an elevated temperature for a time sufficient to convert the preceramic polysilazane into a stable silicon carbide ceramic char material, determining the ceramic char yield and the silicon and carbon content of the stable silicon carbide ceramic char material, and then calculating the amount of free carbon in the stable silicon carbide ceramic char material per part of the preceramic polysilazane and wherein the metal-containing sintering aid is selected from the group consisting of boron, boron-containing compounds, aluminum, and aluminum-containing compounds.

3. A method as described in claim 1 wherein the preceramic polysilazane is present at such a level that the free carbon value of the mixture is greater than 0.8 weight percent, wherein the sintered body of silicon carbide has a density greater than 2.7 g/cm$^3$, and wherein the metal-containing sintering aid is selected from the group consisting of boron, boron-containing compounds, aluminum, and aluminum-containing compounds.

4. A method as described in claim 2 wherein the preceramic polysilazane is present at such a level that the free carbon value of the mixture is greater than 0.8 weight percent and wherein the sintered body of silicon carbide has a density greater than 2.7 g/cm$^3$.

5. A method as described in claim 3 wherein the intimate mixture also contains a polysilazane curing agent in an effective amount to cure the polysilazane.

6. A method as described in claim 4 wherein the intimate mixture also contains a polysilazane curing agent in an effective amount to cure the polysilazane.

7. A method as described in claim 3 wherein the preceramic polysilazane contains [$R_2SiNH$] and [$RSi(NU)_{1.5}$] units where each R is independently selected from the group consisting of hydrogen, alkyl radicals containing 1 to 20 carbon atoms, phenyl radicals, and vinyl radicals and wherein the sintering is carried out without pressure.

8. A method as described in claim 5 wherein the preceramic polysilazane contains [$R_2SiNH$] and [$RSi(NH)_{1.5}$] units where each R is independently selected from the group consisting of hydrogen, alkyl radicals containing 1 to 20 carbon atoms, phenyl radicals, and vinyl radicals and wherein the sintering is carried out without pressure.

9. A method as described in claim 3 wherein the preceramic polysilazane is a silacyclobutasilazane polymer.

10. A method as described in claim 4 wherein the preceramic polysilazane is a silacyclobutasilazane polymer.

11. A method as described in claim 7 wherein the preceramic polysilazane is present at such a level that the free carbon value of the mixture is between 0.8 and 3.0 weight percent.

12. A method as described in claim 9 wherein the preceramic polysilazane is present at such a level that the free carbon value of the mixture is between 0.8 and 3.0 weight percent.

13. A method as described in claim 11 wherein the preceramic polysilazane is present at such a level that the free carbon value of the mixture is between 1.5 and 2.5 weight percent.

14. A method as described in claim 11 wherein the preceramic polysilazane is present at such a level that the free carbon value of the mixture is between 1.5 and 2.5 weight percent.

15. A method as described in claim 13 wherein the metal-containing sintering aid is boron or boron carbide.

16. A method as described in claim 14 wherein the metal-containing sintering aid is boron or boron carbide.

17. A method as described in claim 15 wherein the handleable green body is sintered at a temperature of 2000° to 2200° C. to obtain a sintered body of silicon carbide with a density greater than 2.9 g/cm$^3$.

18. A method as described in claim 16 wherein the handleable green body is sintered at a temperature of 2000° to 2200° C. to obtain a sintered body of silicon carbide with a density greater than 2.9 g/cm$^3$.

19. A method as described in claim 6 wherein the handleable green body is cured prior to the sintering step.

20. A method as described in claim 10 wherein the handleable green body is cured prior to the sintering step.

21. A method of forming a handleable green body, which method comprises
(a) preparing an intimate mixture comprising silicon carbide powder, a metal-containing sintering aid, and a preceramic polysilazane, where the metal-containing sintering aid is present at 0.1 to 3.0 weight percent of the metal based on the weight of silicon carbide powder and where the preceramic polysilazane is present at such a level that the free carbon value of the mixture is greater than 0.4 weight percent based on the total weight of the silicon carbide powder and the char derived from the preceramic polysilazane; and
(b) forming the intimate mixture into the desired shape under pressure at a temperature less than about 500° C.

22. A method as described in claim 21 wherein the free carbon value of the preceramic polysilazane is determined, prior to preparing the intimate mixture, by heating a known amount of the preceramic polysilazane under an inert atmosphere to an elevated temperature for a time sufficient to convert the preceramic polysilazane into a stable silicon carbide ceramic char material, determining the ceramic char yield and the silicon and carbon content of the stable silicon carbide ceramic char material, and then calculating the amount of free carbon in the stable silicon carbide ceramic char material per part of the preceramic polysilazane and wherein the metal-containing sintering aid is selected from the group consisting of boron, boron-containing compounds, aluminum, and aluminum-containing compounds.

23. A method as described in claim 21 wherein the preceramic polysilazane is present at such a level that the free carbon value of the mixture is greater than 0.8 weight percent and wherein the metal-containing sintering aid is selected from the group consisting of boron, boron-containing compounds, aluminum, and aluminum-containing compounds.

24. A method as described in claim 22 wherein the preceramic polysilazane is present at such a level that the free carbon value of the mixture is greater than 0.8 weight percent.

25. A method as described in claim 23 wherein the intimate mixture also contains a polysilazane curing agent in an effective amount to cure the polysilazane.

26. A method as described in claim 24 wherein the intimate mixture also contains a polysilazane curing agent in an effective amount to cure the polysilazane.

27. A method as described in claim 23 wherein the preceramic polysilazane contains [$R_2SiNH$] and [$RSi(NH)_{1.5}$] units where each R is independently selected from the group consisting of hydrogen, alkyl radicals containing 1 to 20 carbon atoms, phenyl radicals, and vinyl radicals.

28. A method as described in claim 25 wherein the preceramic polysilazane contains [$R_2SiNH$] and [$RSi(NH)_{1.5}$] units where each R is independently selected from the group consisting of hydrogen, alkyl radicals containing 1 to 20 carbon atoms, phenyl radicals, and vinyl radicals.

29. A method as described in claim 23 wherein the preceramic polysilazane is a silacyclobutasilazane polymer.

30. A method as described in claim 24 wherein the preceramic polysilazane is a silacyclobutasilazane polymer.

31. A method as described in claim 25 wherein the preceramic polysilazane is present at such a level that the free carbon value of the mixture is between 1.5 and 2.5 weight percent.

32. A method as described in claim 27 wherein the preceramic polysilazane is present at such a level that the free carbon value of the mixture is between 1.5 and 2.5 weight percent.

33. A method as described in claim 31 wherein the metal-containing sintering aid is boron or boron carbide.

34. A method as described in claim 32 wherein the metal-containing sintering aid is boron or boron carbide.

35. A method as described in claim 26 wherein the handleable green body is cured.

36. A method as described in claim 30 wherein the handleable green body is cured.

37. A uniform mixture comprising silicon carbide powder, a metal-containing sintering aid, and a preceramic polysilazane, where the metal-containing sintering aid is present at 0.1 to 3.0 weight percent of the metal based on the weight of silicon carbide powder and where the preceramic polysilazane is present at such a level that the free carbon value of the mixture is greater than 0.4 weight percent based on the total weight of the silicon carbide powder and the char derived from the preceramic polysilazane.

38. A uniform mixture as described in claim 37 wherein the preceramic polysilazane is present at such a level that the free carbon value of the mixture is greater than 0.8 weight percent and wherein the metal-containing sintering aid is selected from the group consisting of boron, boron-containing compounds, aluminum, and aluminum-containing compounds.

39. A uniform mixture as described in claim 38 which also contains a polysilazane curing agent in an effective amount to cure the polysilazane.

40. A uniform mixture as described in claim 38 wherein the preceramic polysilazane contains [R$_2$SiNH] and [RSi(NH)$_{1.5}$] units where each R is independently selected from the group consisting of hydrogen, alkyl radicals containing 1 to 20 carbon atoms, phenyl radicals, and vinyl radicals.

41. A uniform mixture as described in claim 39 wherein the preceramic polysilazane contains [R$_2$SiNH] and [RSi(NH)$_{1.5}$] units where each R is independently selected from the group consisting of hydrogen, alkyl radicals containing 1 to 20 carbon atoms, phenyl radicals, and vinyl radicals.

42. A uniform mixture as described in claim 38 wherein the preceramic polysilazane is a silacyclobutasilazane polymer.

43. A uniform mixture as described in claim 39 wherein the preceramic polysilazane is a silacyclobutasilazane polymer.

44. A uniform mixture as described in claim 38 wherein the preceramic polysilazane is present at such a level that the free carbon value of the mixture is between 1.5 and 2.5 weight percent.

45. A uniform mixture as described in claim 41 wherein the preceramic polysilazane is present at such a level that the free carbon value of the mixture is between 1.5 and 2.5 weight percent.

46. A uniform mixture as described in claim 43 wherein the preceramic polysilazane is present at such a level that the free carbon value of the mixture is between 1.5 and 2.5 weight percent.

47. A uniform mixture as described in claim 45 wherein the metal-containing sintering aid is boron or boron carbide.

48. A uniform mixture as described in claim 46 wherein the metal-containing sintering aid is boron or boron carbide.

* * * * *